UNITED STATES PATENT OFFICE.

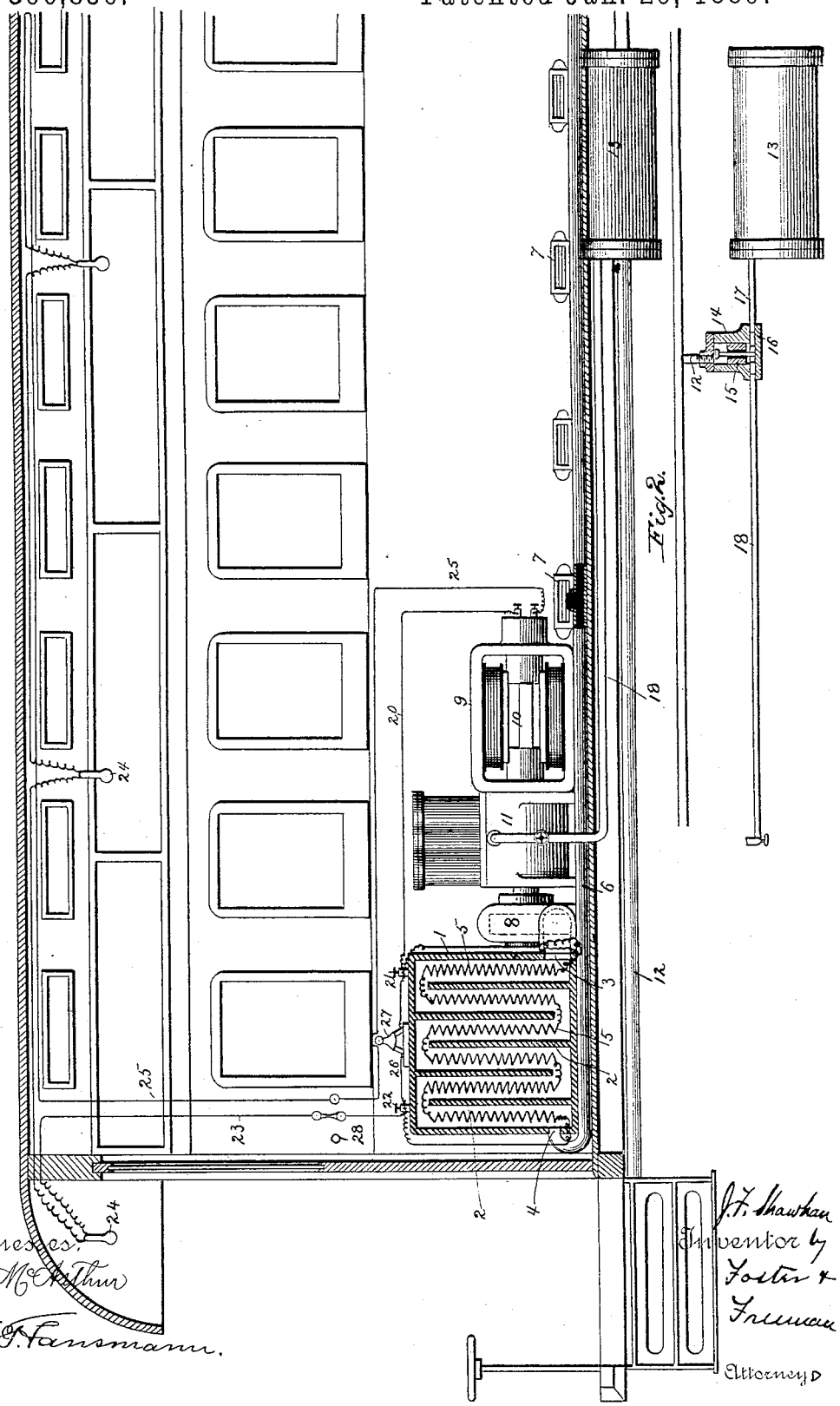

JABEA F. SHAWHAN, OF DAYTON, OHIO, ASSIGNOR OF ONE-HALF TO JAMES W. CARPENTER, OF SAME PLACE.

ELECTRIC LIGHTING AND HEATING CARS.

SPECIFICATION forming part of Letters Patent No. 396,836, dated January 29, 1889.

Application filed March 23, 1888. Serial No. 268,269. (No model.)

*To all whom it may concern:*

Be it known that I, JABEA F. SHAWHAN, a citizen of the United States, and a resident of Dayton, Montgomery county, Ohio, have invented certain new and useful Improvements in Electric Lighting and Heating Cars, of which the following is a specification.

My invention relates to the heating and lighting of cars by electricity; and it has for its object to provide apparatus whereby cars may be lighted and heated by means of an electric current which is generated on board the car, the power for which is furnished from some suitable source from the engine—as steam, compressed air, or otherwise—and especially from connections with the ordinary automatic brake apparatus; and my invention consists in certain combinations and arrangements of parts, substantially as more particularly pointed out hereinafter.

In the accompanying drawings, Figure 1 is a sectional view of a portion of an ordinary railway-car, showing one arrangement and adaptation of my invention, and Fig. 2 is a detail view showing a means of connection with the pipe of the ordinary brake apparatus connected with the car.

Heretofore many attempts have been made to light railway-cars by electricity—as by mounting a generator on the locomotive or a car in the train and conducting the electricity from car to car by means of flexible conductors; but it has been found in practice that there are many disadvantages to this mode of operation, in that the connections quickly become worn or disarranged, and there is difficulty in maintaining the circuits so as to furnish a uniform illumination throughout the train. More than that, when the cars become detached there is no means of continuing the supply of light. This objection, however, has been overcome to a certain extent by the use of secondary batteries, which have been placed upon each separate car to furnish light therefor; but it has been found to be an expensive and uncertain mode of lighting cars, and it has been impracticable to carry a sufficient number of batteries to furnish a means for heating the cars. It has also been proposed to provide a reservoir on each car, which shall store some force necessary to light the cars when they are separated or detached from the train. It has also been proposed to derive power from the axles of the trucks of the cars to supply the force necessary to light them.

My invention contemplates both lighting and heating the cars by electricity by a current generated in each individual car, and by power which may be derived from some central source—as from the locomotive-engine or from a stored power on the car itself—so that the car will be lighted and heated when connected with the train or when detached therefrom. Further than that, the arrangement permits of aiding in ventilating the car when it is unnecessary to supply heat thereto.

With this general statement of my invention, I will refer to the drawings to illustrate one preferred embodiment thereof, in which—

1 is a case preferably having a series of partitions, 2, extending nearly across the case and forming a tortuous passage therethrough between the openings 3 and 4, so that the air will have a comparatively long distance to travel and be exposed throughout its passage through the case to the heat effects of the electric heating apparatus inclosed therein.

This electric heating apparatus is shown in the drawings as consisting of a series of coils, 5, of some high-resistance medium—such, for instance, as German silver wire or carbon or other conductor which will become heated by the current flowing through it—and in this manner it will be observed that the air passing through the case is almost continually in contact with the heated conductor. Connected to the case is one or more pipes or distributers, 6, which are arranged to pass through the car, preferably at the sides thereof, and are provided with a series of registers, 7, located in different parts of the car and preferably with relation to each seat. These registers are connected to the distributing-pipes in any usual way, and it will be seen that they can be controlled by the passengers occupying the car adjacent to the register, so that the heat may be regulated to suit the individual wishes of the passengers.

In order to supply air to the case of the heater I make use of a rotary blower or fan, 8, or other equivalent means of propelling the air therethrough. The inlet of this blower may be open, so as to take the air directly from the car; or, if desired, it may take the air from the outside of the car, at pleasure.

In order to produce the necessary electric current to operate the heater, I place a generator, 9, in the car and operate the armature 10 thereof by means of a motor, 11, preferably attached directly to the armature-shaft, and in the present instance I have shown the fan or blower also operated directly from the shaft of the motor. While this motor may be operated by any desired force, I have shown it connected so as to receive its power from the compressed air or steam of the brake system of the car; and 12 represents the pipe-conducting said power from the engine or other source of generation. In order that the operation of the motor 11 may not interfere with the ordinary operation of the brakes upon the car, I interpose a fluid-receiving tank, 13, which is connected to the pipe 12, so as to take the surplus pressure in said pipe, and a suitable valve, 14, is arranged to prevent the pressure falling in the tank when, for instance, the brake is operated in the usual way. Thus the fluid-tank is supplied with a certain amount of fluid under pressure sufficient to operate the motor for a considerable length of time. While any suitable valve may be used, I have shown one of simple construction interposed between the pipe 12 of the brake-system and the tank 13, and it will be understood that when the pressure in the pipe 12 is greater than the pressure in the tank 13 the valve-plunger 15 will be raised, so that the fluid under pressure may pass through the opening 16 therein and thence through the connection 17 into the tank 13; or if the motor 11 is being operated part of it will pass through the pipe 18 to the motor and the motor will be operated directly from the pressure in the pipe 12. When, however, the pressure in pipe 12, through any cause, as before stated, is reduced so as to be less than the pressure in the tank 13, the plunger 15 will fall and close the passage from the pipe 12, when the power to drive the motor 11 will be received from the tank 13 through the connections 17 and 18. Of course the pressure in the tank under these circumstances will gradually diminish; but I have found from experience that I can store sufficient power in the tank to run the motor a considerable time, and thereby maintain the lighting and heating of the car when detached from the train as long as is usually required in such cases. The length of time the motor will run after the car is detached, other things being equal, will of course depend upon the size of the tank; and it is evident that the tank can be proportioned for the service required, or a number of tanks may be used, all connected in the manner illustrated in relation to tank 13.

The electric connections of course may be varied to suit the requirements of the case. I have shown, however, a circuit from the generator in which the conductor 20 is connected to a binding-post, 21, on the heater, and from thence the current passes through the coils 5 and to the other binding-post, 22, and from this post it passes, by means of conductor 23, to the lamps 24, arranged in proper position throughout the car, and thence returns, by conductor 25, to the machine. It will thus be seen that in this arrangement the heater and lamps are connected in series. When, however, it is desirable to use the lamps without the heater, I provide a short circuit, 26, between the binding-posts 21 and 22, which is controlled by the switch 27, and this being in place, as indicated in the drawings, will short-circuit the heater and allow the current to flow directly to the lamps. If it is desirable to operate the heater and not the lamps, by means of the switch 28 the lamps may be cut out and the heater alone included in the circuit.

If perchance it is desired to assist in ventilating the car without heating or lighting, it is only necessary to open the electric circuit and operate the fan to force air through the heating-case, when, by means of the register 7, the cool air can be controlled to suit the wishes of the passengers. It will thus be seen that by my arrangement not only can the cars be lighted and heated, but the power can be used to assist in ventilating or cooling the cars; and I have found that the whole arrangement can be made exceedingly simple and compact, and power can be furnished to run the same substantially in the manner indicated without materially interfering with the ordinary arrangement of the brake apparatus, and practically without extra cost for power.

While I have illustrated one form of apparatus, it is evident from the above that my invention is not limited to the use of a particular form of heater, generator, or motor, as those shown in the drawings are illustrated simply as typical forms which may be used and as being forms which are well adapted for the purposes indicated. It is also evident that the location of the apparatus on the car is a matter of convenience, for while I have shown it in the usual position of the heating apparatus at the end of the car, it is evident it may be placed in any other desired relation thereto.

What I claim is—

1. The combination, in a car having a fluid-pressure brake apparatus, of a motor receiving its power from the brake apparatus, an electric generator driven by the motor, and an electric heating apparatus connected with the generator, substantially as described.

2. The combination, in a car having a fluid-pressure brake apparatus, of a motor receiving its power from the brake apparatus, an electric generator connected to the motor, an electric heating apparatus and electric lights, and circuits and connections between the generator, heater, and lights, substantially as described.

3. The combination, in a car, of a motor, an electric generator, an electric heating apparatus connected with the generator, a fan also connected with the motor, and pipes connected with the heater and distributing the air therefrom throughout the car, substantially as described.

4. The combination, in a car, of a motor, an electric generator connected to the shaft of the motor, a fan also connected to the shaft of the motor, an electric heater connected in circuit from the generator, and pipes leading therefrom to distribute the air throughout the car, substantially as described.

5. The combination of a motor, an electric generator driven thereby, an electric heater having a series of partitions extending partially through the heater, a series of electric conductors of high resistance, and a fan for propelling the air through the heater in contact with the heated conductors, substantially as described.

6. The combination, with a car provided with a fluid-pressure brake apparatus and a reservoir connected therewith, of a motor, an electric generator, a heater, a number of electric lamps, circuits from the generator, including the heater and lamps, and switches whereby the heater or the lamps, or both the heater and lamps, may be connected in circuit with the generator, substantially as described.

7. The combination, in a car provided with the ordinary fluid-pressure brake apparatus, of a reservoir connected with said apparatus, a valve interposed between the brake apparatus and reservoir, a motor connected with said valve, and an electric generator operated by said motor, substantially as described.

8. The combination, with a car provided with the ordinary fluid-pressure brake apparatus, of a reservoir connected with said brake apparatus, a motor connected with the valve, and a generator driven by said motor, whereby the motor is operated directly from the brake apparatus when the pressure is greater therein than in the reservoir and from the reservoir when the pressure therein is greater than in the brake apparatus, substantially as described.

In testimony whereof I have signed my name to this specification in the presence of two subscribing witnesses.

JABEA F. SHAWHAN.

Witnesses:
J. S. BARKER,
GEO. H. GRAHAM.